US006883851B2

(12) United States Patent
McClure et al.

(10) Patent No.: US 6,883,851 B2
(45) Date of Patent: Apr. 26, 2005

(54) CARGO CARRYING SYSTEM HAVING MULTIPLE CLOSURE MEMBERS

(75) Inventors: Kerry Stephen McClure, Dublin, OH (US); Robb Louis Augustine, Dublin, OH (US); Emily C. Nutwell, Dublin, OH (US)

(73) Assignee: Honda Motor Company, Ltd., Tokyo (JP)

( * ) Notice: Subject to any disclaimer, the term of this patent is extended or adjusted under 35 U.S.C. 154(b) by 0 days.

(21) Appl. No.: 10/663,271

(22) Filed: Sep. 16, 2003

(65) Prior Publication Data

US 2005/0057062 A1    Mar. 17, 2005

(51) Int. Cl.⁷ .................................................. B60R 7/04
(52) U.S. Cl. .................................. 296/37.14; 224/42.2
(58) Field of Search .......................... 296/37.6, 37.14; 224/42.2, 42.12

(56) References Cited

U.S. PATENT DOCUMENTS

| | | | |
|---|---|---|---|
| 2,140,615 A | 12/1938 | Biszantz | |
| 2,547,083 A | 4/1951 | Lundgren | |
| 3,287,058 A * | 11/1966 | Wells | 296/37.14 |
| 3,559,829 A | 2/1971 | Shamel | |
| 3,764,048 A | 10/1973 | Gore | |
| 3,880,335 A * | 4/1975 | Winkler | 224/42.2 |
| 3,940,041 A | 2/1976 | Bott | |
| 3,960,048 A | 6/1976 | Wagner | |
| 4,337,976 A | 7/1982 | Lapine et al. | |
| 4,351,555 A | 9/1982 | Hashimoto | |
| 4,418,852 A | 12/1983 | Grinwald | |
| 4,423,900 A | 1/1984 | Sugimoto et al. | |
| 4,533,169 A | 8/1985 | Rauthmann et al. | |
| 4,548,540 A | 10/1985 | Renfro | |

(Continued)

OTHER PUBLICATIONS

U.S. Appl. No. 10/663,272 filed Sep. 16, 2003, McClure et al.

*Primary Examiner*—Lori L. Coletta
(74) *Attorney, Agent, or Firm*—Dinsmore & Shohl LLP

(57) ABSTRACT

A truck bed for a pickup truck includes a metal support structure that is in a fixed position relative to a pickup truck. A shell is fixedly supported by the metal support structure and is configured to integrally define a portion of a first chamber and a portion of a second chamber. The first chamber is adjacent to the second chamber at an interface, and the first and second chambers are disposed substantially beneath a plane. The plane is defined by a cargo carrying floor that is integrally provided by the truck bed. A first closure member includes a first support surface and is associated with the shell. The first closure member is moveable between a first position in which the first support surface is substantially coplanar with the plane and is configured to support cargo directly above the first chamber, and a second position in which the first closure member is at least partially removed to provide access to the first chamber from above the plane. A second closure member is associated with the shell and includes a second support surface for supporting cargo directly above the second chamber. The second support surface is substantially coplanar with the plane. The second chamber can be configured to provide a storage location, the storage location being configured to substantially surround an entire spare tire for a pickup truck directly beneath the second closure member.

36 Claims, 6 Drawing Sheets

U.S. PATENT DOCUMENTS

| | | |
|---|---|---|
| 4,600,233 A | 7/1986 | Boydston |
| 4,695,087 A | 9/1987 | Hollrock |
| 4,733,898 A | 3/1988 | Williams |
| 4,836,600 A | 6/1989 | Miyazaki et al. |
| 4,941,703 A | 7/1990 | Curry |
| 4,944,544 A | 7/1990 | Dick |
| 4,946,215 A | 8/1990 | Taylor |
| 4,998,769 A | 3/1991 | Johnson et al. |
| 5,026,107 A | 6/1991 | Hess |
| 5,056,846 A | 10/1991 | Tanaka |
| 5,056,858 A | 10/1991 | Tanaka |
| 5,061,002 A | 10/1991 | Saso |
| 5,125,710 A | 6/1992 | Gianelo |
| 5,172,519 A | 12/1992 | Cooper |
| 5,192,108 A | 3/1993 | Richardson et al. |
| 5,251,947 A | 10/1993 | Kirila, II et al. |
| 5,316,358 A | 5/1994 | Payne et al. |
| 5,324,089 A | 6/1994 | Schlachter |
| 5,372,289 A | 12/1994 | Dachicourt |
| 5,382,069 A | 1/1995 | Chambers |
| 5,441,183 A | 8/1995 | Frenzel |
| 5,458,353 A | 10/1995 | Hanemaayer |
| 5,492,257 A | 2/1996 | Demick |
| 5,518,158 A | 5/1996 | Matlack |
| 5,520,316 A | 5/1996 | Chen |
| 5,564,776 A | 10/1996 | Schlachter |
| 5,599,054 A | 2/1997 | Butz et al. |
| 5,615,922 A | 4/1997 | Blanchard |
| 5,626,380 A | 5/1997 | Elson et al. |
| 5,632,520 A | 5/1997 | Butz |
| 5,636,890 A | 6/1997 | Cooper |
| 5,669,534 A | 9/1997 | Edgerley |
| 5,716,091 A | 2/1998 | Wieczorek |
| 5,762,245 A | 6/1998 | Hurst |
| 5,784,769 A | 7/1998 | Clare |
| 5,797,642 A | 8/1998 | Takanishi et al. |
| 5,799,845 A | 9/1998 | Matsushita |
| 5,823,585 A | 10/1998 | Tanguay |
| 5,823,598 A | 10/1998 | Clare et al. |
| 5,826,931 A | 10/1998 | Perlman et al. |
| 5,836,637 A | 11/1998 | Laginess et al. |
| 5,842,730 A | 12/1998 | Schneider et al. |
| 5,860,687 A | 1/1999 | Corporon et al. |
| 5,895,086 A | 4/1999 | Carico |
| 5,915,777 A | 6/1999 | Gignac et al. |
| 5,961,172 A | 10/1999 | Ament et al. |
| 5,964,491 A | 10/1999 | Marsh et al. |
| 5,971,462 A | 10/1999 | Bell et al. |
| 5,979,962 A | 11/1999 | Valentin et al. |
| 5,979,973 A * | 11/1999 | Clare et al. ................. 296/37.6 |
| 6,003,921 A | 12/1999 | Tozuka |
| 6,015,177 A | 1/2000 | Tijerina |
| 6,027,155 A | 2/2000 | Wisniewski et al. |
| 6,030,018 A | 2/2000 | Clare et al. |
| 6,033,002 A | 3/2000 | Clare et al. |
| 6,039,105 A | 3/2000 | Patmore et al. |
| 6,039,378 A | 3/2000 | Bailey |
| 6,050,202 A | 4/2000 | Thompson |
| 6,059,141 A | 5/2000 | Wojnowski |
| 6,059,341 A | 5/2000 | Jensen et al. |
| 6,065,794 A | 5/2000 | Schlachter |
| 6,073,985 A | 6/2000 | Keip |
| 6,082,804 A | 7/2000 | Schlachter |
| 6,089,639 A * | 7/2000 | Wojnowski ................. 296/37.6 |
| 6,092,852 A | 7/2000 | Lawrence |
| 6,102,464 A | 8/2000 | Schneider et al. |
| 6,102,474 A | 8/2000 | Daley |
| 6,113,172 A | 9/2000 | Chaloult et al. |
| 6,126,219 A | 10/2000 | Wilkinson et al. |
| 6,129,401 A | 10/2000 | Neag et al. |
| 6,135,527 A | 10/2000 | Bily |
| 6,155,625 A | 12/2000 | Felix |
| 6,170,724 B1 | 1/2001 | Carter et al. |
| 6,199,930 B1 | 3/2001 | Riley |
| 6,224,138 B1 | 5/2001 | Adsit et al. |
| 6,231,100 B1 | 5/2001 | Fournier |
| 6,234,559 B1 | 5/2001 | Block et al. |
| 6,237,211 B1 | 5/2001 | Clare et al. |
| 6,241,137 B1 | 6/2001 | Corr |
| 6,247,741 B1 | 6/2001 | Seel et al. |
| 6,254,162 B1 | 7/2001 | Faber et al. |
| 6,267,427 B1 | 7/2001 | Ziehl |
| 6,283,526 B1 | 9/2001 | Keough et al. |
| 6,290,278 B1 | 9/2001 | Loveland |
| 6,296,289 B1 | 10/2001 | Gehring et al. |
| 6,302,465 B1 | 10/2001 | Faber et al. |
| 6,328,366 B1 | 12/2001 | Foster et al. |
| 6,336,671 B1 | 1/2002 | Leonardi |
| 6,389,670 B1 | 5/2002 | Morin et al. |
| 6,422,567 B1 | 7/2002 | Mastrangelo et al. |
| 6,439,633 B1 | 8/2002 | Nemoto |
| 6,481,773 B1 * | 11/2002 | Salani et al. ............. 296/37.14 |
| 6,502,886 B1 * | 1/2003 | Bleau et al. ............. 296/37.14 |
| 6,719,348 B1 * | 4/2004 | Song ....................... 296/37.14 |
| 2001/0013709 A1 | 8/2001 | Clare et al. |
| 2001/0041126 A1 | 11/2001 | Morin et al. |
| 2001/0051089 A1 | 12/2001 | Morin et al. |
| 2001/0052714 A1 | 12/2001 | Clare |
| 2002/0070574 A1 * | 6/2002 | Carlsson et al. ......... 296/37.14 |
| 2003/0057724 A1 * | 3/2003 | Inagaki et al. ........... 296/37.14 |
| 2003/0090120 A1 * | 5/2003 | Barber et al. ............ 296/37.14 |

* cited by examiner

CARGO CARRYING SYSTEM HAVING MULTIPLE CLOSURE MEMBERS

TECHNICAL FIELD

The present invention relates to a cargo carrying system for integration into the bed of a pickup truck. The cargo carrying system can be configured to store one or more items, such as a spare tire, below the floor of the pickup truck bed.

BACKGROUND OF THE INVENTION

Pickup trucks are commonly used to facilitate transportation of cargo items from one location to another. While pickup trucks are available in many sizes and configurations, a typical pickup truck includes a truck bed having a cargo carrying floor that can support cargo, such as lumber, rocks, groceries and/or other items. Because a conventional truck bed is open to the atmosphere, such a truck bed, without protection, is unsuitable to support cargo that is sensitive to theft and/or damage by environmental elements.

For these reasons, certain protective devices such as truck caps, tonneau covers, and toolboxes are in widespread use to protect cargo within a truck bed from weather, dirt and other environmental elements. However, such protective devices tend to reduce the storage and transport capacity of the truck bed. For example, a truck cap or a bed lid, both of which are typically fitted to the sides of a truck bed above the bed floor, significantly limit the use of a truck bed to haul or store tall or wide cargo (that would otherwise fit into a truck bed not fitted with a truck cap or bed lid). Other common protective devices include tonneau covers and toolboxes, but these devices can only protect a limited amount of cargo, and in doing so substantially reduce the truck bed's storage capacity for unprotected cargo. In short, presently available equipment for protecting cargo in truck beds, such as truck caps, bed lids, tonneau covers and toolboxes, significantly limit the flexibility and cargo carrying capacity of a truck bed.

However, without such protective devices, a conventional pickup truck provides few storage options for cargo that requires protection from theft and/or environmental elements. Consequently, pickup truck users typically must choose between flexibility/capacity and protecting their cargo. Accordingly, there is a need for a pickup truck having a truck bed that is configured to protect certain cargo from theft and from environmental conditions, but that provides the full capacity and flexibility for hauling unprotected cargo as would be provided by a similarly-sized conventional pickup truck having an unprotected truck bed. There is a further need for a spare tire storage location on a pickup truck that substantially protects the spare tire from moisture and debris, and that facilitates simple and clean access to the spare tire by an operator of the pickup truck.

SUMMARY OF THE INVENTION

Accordingly, it is an aspect of the present invention to provide an improved truck bed for a pickup truck that protects certain cargo from the environment without substantially diminishing the overall cargo carrying capabilities of the truck bed.

To achieve the foregoing and other aspects, and in accordance with the purposes of the present invention defined herein, a truck bed for a pickup truck is provided. In one embodiment, the truck bed includes a metal support structure that is in a fixed position relative to a pickup truck. A shell is fixedly supported by the metal support structure and is configured to integrally define a portion of a first chamber and a portion of a second chamber. The first chamber is adjacent to the second chamber at an interface, and the first and second chambers are disposed substantially beneath a plane. The plane is defined by a cargo carrying floor that is integrally provided by the truck bed. A first closure member includes a first support surface and is associated with the shell. The first closure member is moveable between a first position in which the first support surface is substantially coplanar with the plane and is configured to support cargo directly above the first chamber, and a second position in which the first closure member is at least partially removed to provide access to the first chamber from above the plane. A second closure member is associated with the shell and includes a second support surface for supporting cargo directly above the second chamber. The second support surface is substantially coplanar with the plane, and the second chamber is configured to provide a storage location. The storage location is configured to substantially surround an entire spare tire for a pickup truck directly beneath the second closure member.

In another exemplary embodiment of the present invention, a truck bed for a pickup truck is provided. The truck bed includes a metal support structure that is in a fixed position relative to a pickup truck. A shell is fixedly supported by the metal support structure and is configured to integrally define a portion of a first chamber and a portion of a second chamber. The first chamber is joined with the second chamber at a constrictive interface, and the first and second chambers are disposed substantially beneath a plane. The plane is defined by a cargo carrying floor that is integrally provided by the truck bed. A first closure member includes a first support surface and is associated with the shell. The first closure member is moveable between a first position in which the first support surface is substantially coplanar with the plane and is configured to support cargo directly above the first chamber, and a second position in which the first closure member is at least partially removed to provide access to the first chamber from above the plane. A second closure member is associated with the shell and includes a second support surface for supporting cargo directly above the second chamber, and the second support surface is substantially coplanar with the plane.

In yet another exemplary embodiment of the present invention, a pickup truck having a truck bed is provided. In this embodiment, a metal support structure is integral with a unibody of a pickup truck. A shell is fixedly supported by the metal support structure and is configured to integrally define a portion of a first chamber and a portion of a second chamber. The first chamber is joined with the second chamber at a constrictive interface. The interface comprises an opening dimensioned to permit the passage of a spare tire for a pickup truck from the first chamber into the second chamber. The first and second chambers are disposed substantially beneath a plane. The plane is defined by a cargo carrying floor that is integrally provided by the truck bed. A first closure member includes a first support surface and is secured with respect to the shell by at least one hinge. The first closure member is moveable between a first position in which the first support surface is substantially coplanar with the plane and is configured to support cargo directly above the first chamber, and a second position in which the first closure member is at least partially removed to provide access to the first chamber from above the plane. A second closure member is fixedly secured with respect to the shell and includes a second support surface for supporting cargo directly above the second chamber. The second support surface is substantially coplanar with the plane, and the second chamber is configured to provide a storage location. The storage location is configured to substantially surround an entire spare tire for a pickup truck directly beneath the second closure member.

The truck beds described herein are advantageous for protecting certain cargo from the environment without substantially diminishing the truck bed's overall cargo carrying capacity and flexibility. As an additional advantage, an exemplary truck bed can provide a spare tire storage location on a pickup truck that substantially protects the spare tire from dirt and moisture, and that facilitates simple and clean access to the spare tire by an operator of the pickup truck. Additional aspects, advantages, and novel features of the invention will be set forth in part in the description that follows, and in part will become apparent to those skilled in the art upon examination of the following or may be learned with the practice of the invention. The aspects and advantages of the invention may be realized and attained by means of the instrumentalities and combinations particularly pointed out in the appended claims.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF EXEMPLARY EMBODIMENTS

Figure 1:
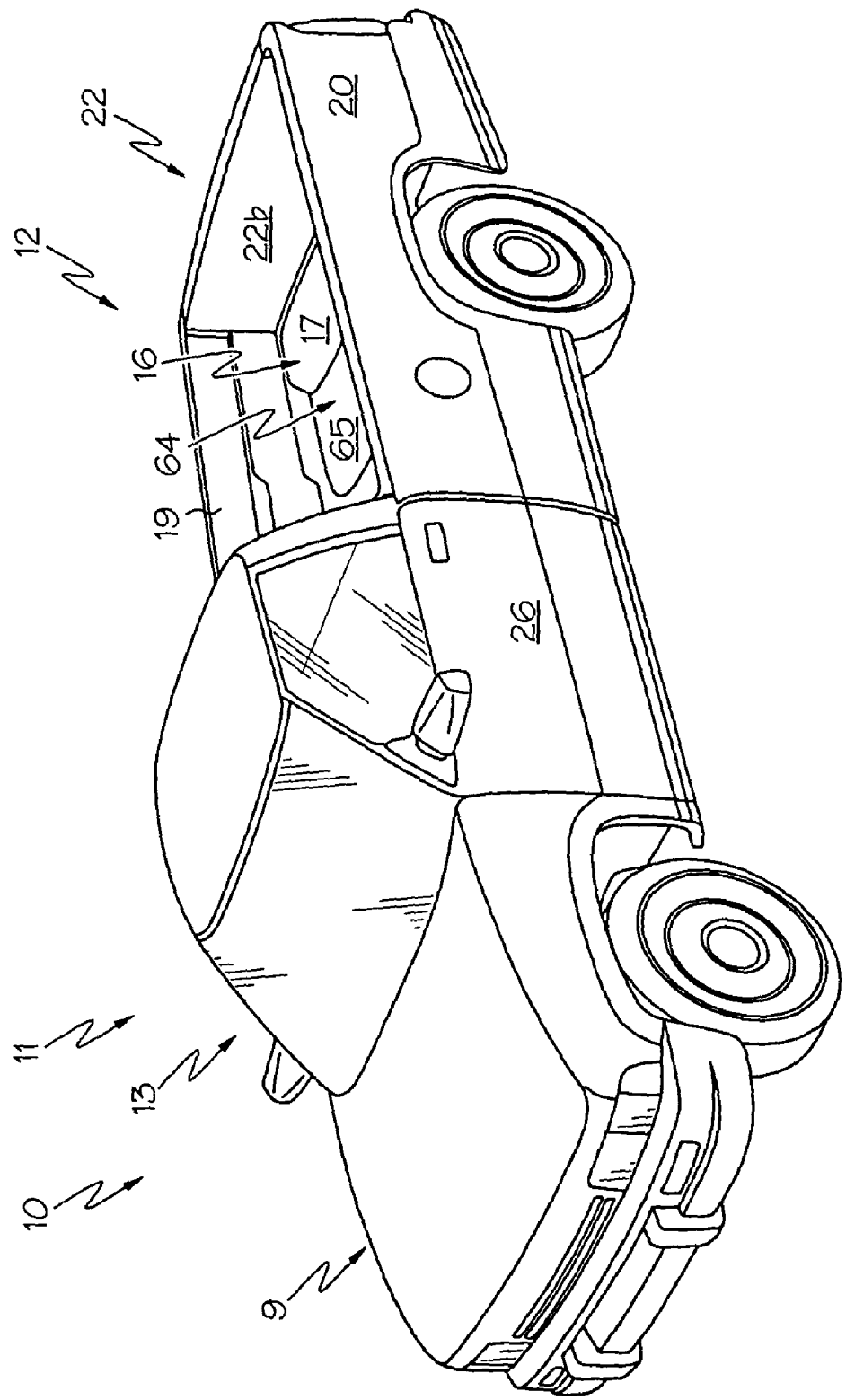
FIG. 1 is a front perspective view of a pickup truck having a truck bed in accordance with one exemplary embodiment of the present invention.

An exemplary embodiment of the invention and its operation is hereinafter described in detail in connection with the views and examples of FIGS. 1–6, wherein like numbers indicate the same or corresponding elements throughout the views. As shown in FIG. 1, a pickup truck 10 can include a cab portion 11 having a passenger compartment 13 and an engine compartment 9. The pickup truck 10 can also include a truck bed portion 12 that is configured to hold cargo. Although the passenger compartment 13 is depicted as having only two passenger doors (e.g., 26), it is to be understood that a truck bed constructed in accordance with the present invention is suitable for use with virtually any type of pickup truck cab, including for example, an extended cab and a crew cab (e.g., with four passenger doors).

The pickup truck 10 includes an integral cargo carrying floor, which provides the primary cargo carrying surface of the truck bed portion 12. For example, a bed floor 14, a first closure member 16 and a second closure member 64 are shown to substantially provide the cargo carrying floor for the exemplary bed portion 12 of FIG. 1. Furthermore, the cargo carrying floor of FIG. 1 is shown to have a substantially flat configuration (defining a plane "P" shown in FIG. 4) and would accordingly be suitable to support sheets of drywall, lumber, or other relatively large cargo. A substantially flat configuration can, of course, include some elevational surface variations such as contours (e.g., 16a and 64a in FIG. 2). Although the truck bed portion 12 is shown in FIG. 1 to include vertically-rising walls (e.g., the headboard, side walls, and tailgate, to be later discussed) along each side of the truck bed's cargo carrying floor, it should be understood that a truck bed constructed in accordance with the present invention might have a substantially flat cargo carrying floor that is unbounded by side walls and/or a tailgate, such as would be typical of a flat-bed type truck.

In the illustration of FIG. 1, the truck bed portion 12 includes a tailgate 22 for restraining cargo within the truck bed portion 12 during movement of the pickup truck 10. However, the truck bed portion 12 might alternatively include a net or cage in lieu of the tailgate 22, or perhaps might not include any such rear cargo restraint whatsoever.

Figure 2:
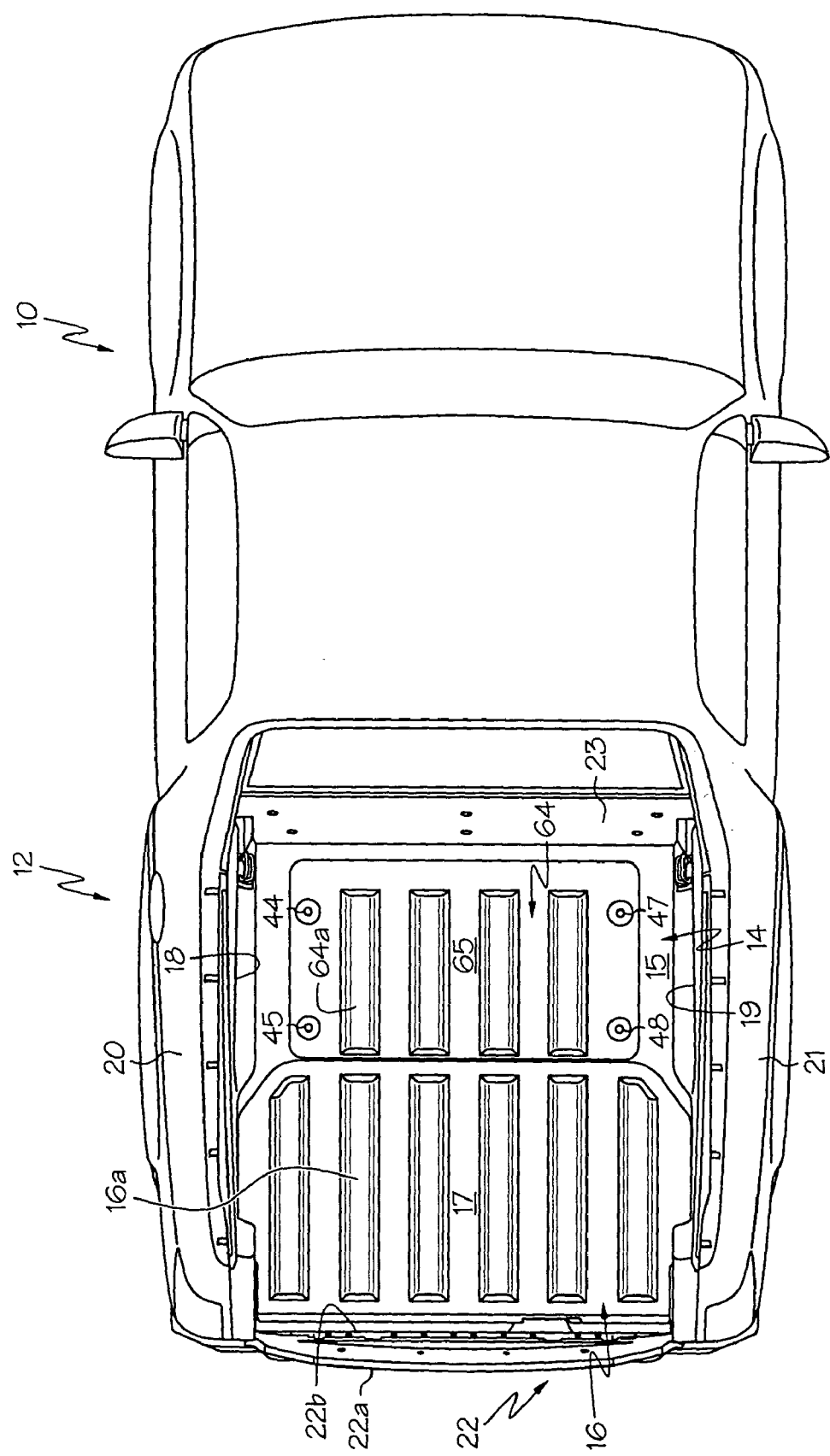
FIG. 2 is a top plan view generally depicting the pickup truck of FIG. 1.

As more clearly shown in FIG. 2, the specifically illustrated truck bed portion 12 is shown to generally include a plurality of outer body components, including a left outer body panel 20, a right outer body panel 21, and portion (e.g., 22a) of tailgate 22. Such outer body components 20, 21, 22a can be formed from any of a variety of materials such as steel, aluminum, plastic, fiberglass, composites, and/or a combination thereof. In one exemplary embodiment, one or more outer body components comprise painted steel sheets. In yet a further embodiment, at least one of the outer body components is formed from plastic.

The truck bed portion 12 can further include one or more inner bed components that substantially define the primary cargo carrying compartment of the pickup truck bed. Such inner bed components can include, for example, a bed floor 14, a first closure member 16 (e.g., such as a cargo lid), and a second closure member 64, as depicted for example in FIG. 2. The first closure member 16 can include a first support surface 17, the second closure member 64 can include a second support surface 65, and the bed floor 14 can include a third support surface 15. The first support surface 17 can be substantially coplanar with the second support surface 65, the third support surface 15, and a plane (e.g., plane "P" depicted in FIG. 4) when the first closure member 16 and the second closure member 64 are closed (e.g., as shown in FIG. 2). In the specifically illustrated embodiment depicted by FIG. 2, for example, the first support surface 17, the second support surface 65, and the third support surface 15 can be configured to directly support cargo.

Figure 4:
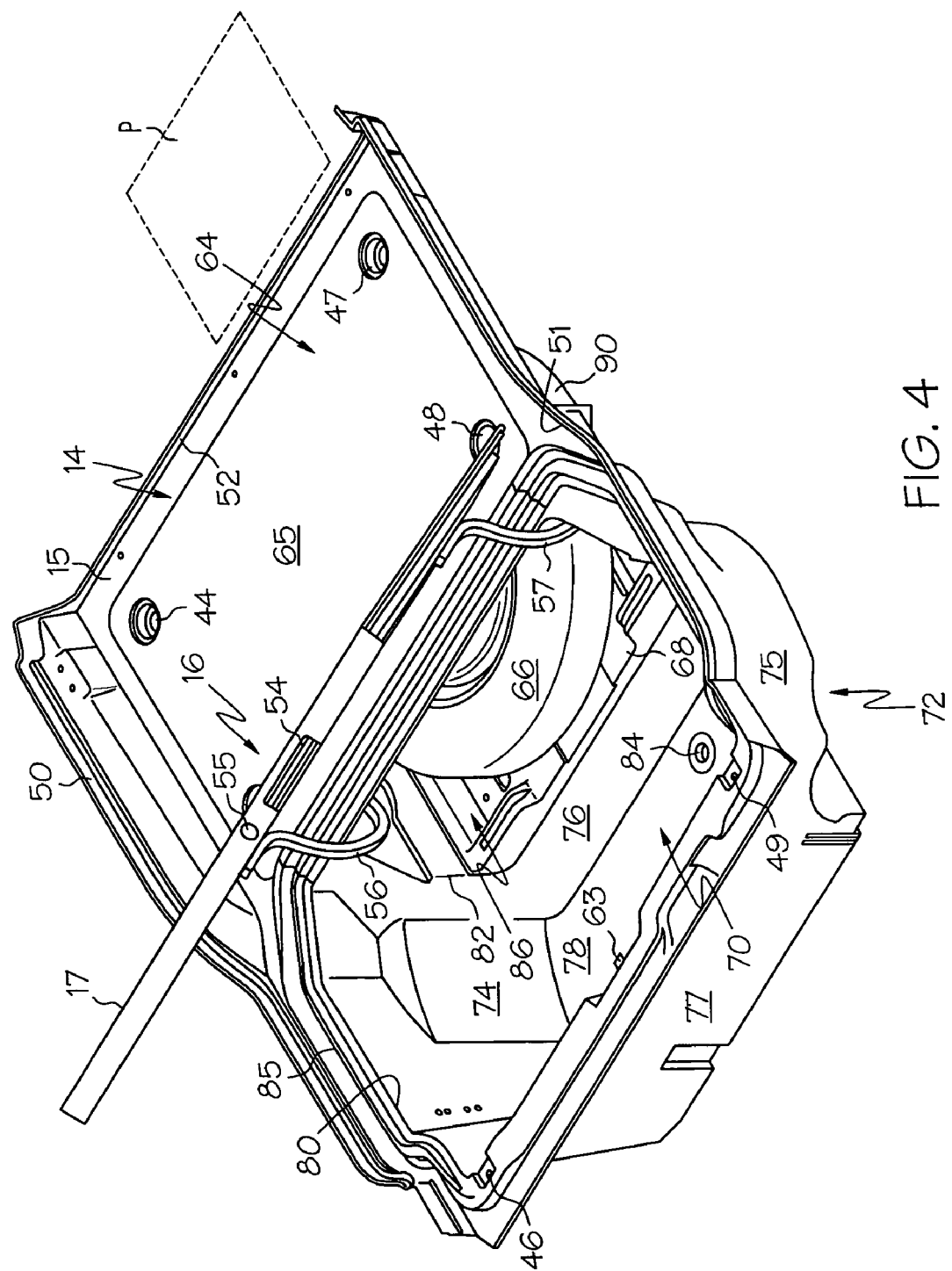
FIG. 4 is a top rear perspective view depicting selected components of the truck bed of FIG. 2 with the first closure member in the opened position and with certain contours of the first closure member and of the second closure member removed for clarity.
Figure 5:
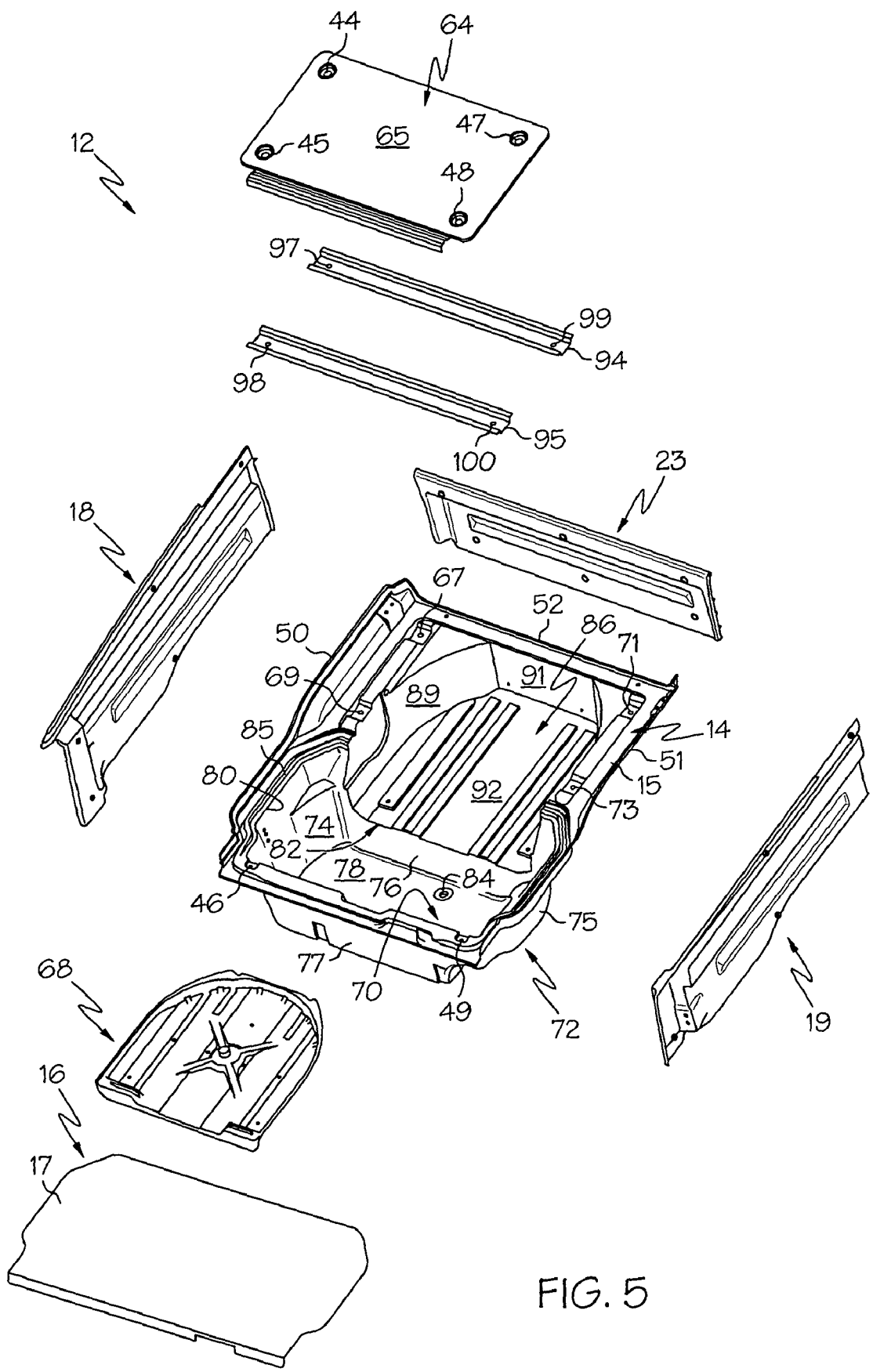
FIG. 5 is an exploded perspective view of selected components of the truck bed of FIG. 2 with certain contours of the first closure member and of the second closure member removed for clarity.

Both the first closure member 16 and the second closure member 64 are shown in FIG. 2 to include raised contours (e.g., 16a and 64a). Although such contours can provide rigidity and/or texture to a cargo carrying floor, it should be understood that an exemplary bed floor and/or closure member might not include any such contours (e.g., as shown in FIGS. 1, 4 and 5). Although FIG. 2 depicts the cargo carrying floor of the truck bed portion 12 as being substantially defined by a single bed floor 14 and two closure members (16 and 64), it is of course to be understood that an exemplary truck bed might have a cargo carrying floor defined by multiple closure members and no bed floor. Alternatively, an exemplary truck bed might have a cargo carrying floor defined by two or more closure members in conjunction with one or more bed floors. If a truck bed includes a plurality of bed floors and/or closure members, each of the bed floors and/or closure members can be oriented substantially coplanarly to define the cargo carrying floor of the truck bed. Adjacent bed floors and/or closure members can be joined directly together such as with adhesives or fasteners, or might alternatively be indirectly connected through hinges and/or a metal support structure, for example. In some exemplary embodiments, one or more closure members might be functionally integral with one or more bed floors of an exemplary cargo carrying floor.

Each closure member of an exemplary truck bed portion can be configured to cover one or more chambers that are disposed substantially beneath the cargo carrying floor of the truck bed portion 12. The chamber(s) can be at least partially defined by a shell (e.g., 72 shown in FIG. 4), wherein the shell can substantially underlie the cargo carrying floor of the truck bed portion 12. In some embodiments, as shown for example in FIGS. 4–5, the shell (e.g., 72) might be integral with at least a portion of the bed floor (e.g., 14). Alternatively, the shell might be formed separately from any portion of the bed floor. An exemplary shell can be formed from one or more components (e.g., panels or members) and can be configured to define two or more chambers.

One or more closure members can be associated with respect to the shell in any of a variety of specific configurations. For example, as depicted in FIG. 4, a first closure member 16 might be secured with respect to the shell 72 with one or more hinges (e.g., hinges 56 and 57 that connect the first closure member 16 to the shell 72). It should be understood, however, that a closure member might alternatively be secured with respect to the shell 72 with a living-type hinge arrangement, a piano-type hinge, flexible straps, chains, ropes, or other such device(s). It should also be understood that a closure member might be associated with the shell 72 without any securement therebetween. As yet a further example of an association between a closure member and a shell, FIG. 4 depicts a second closure member 64 as being fixedly secured with respect to the shell 72. This fixed securement is depicted as being achievable through use of bolts (e.g., inserted through apertures 44, 45, 47 and 48 in the second closure member 64) that connect the second closure member 64 with respect to the shell 72. These bolts maintain the second closure member 64 in a fixed position relative to the shell 72 during normal use of the truck bed. However, the bolts might in some embodiments be removable (e.g., during maintenance of the truck) to allow the second closure member 64 to be removed from the shell 72, and to thereby render the second closure member 64 as being removably fixedly secured with respect to the shell 72.

One or more of the closure members can be moveable (e.g., between opened and closed positions) during normal use. For example, as depicted in FIG. 4, the first closure member 16 is depicted as being moveable between a first position and second position to facilitate selective access to one or more underlying chamber(s), but the second closure member 64 is depicted as being fixedly secured (e.g., in a single position) with respect to the shell 72. In alternate embodiments, both the first and second closure members might be moveable, such as when the first and second closure members are both independently hingedly secured with respect to the shell. Each moveable closure member can be configured to provide access to one or more chambers disposed substantially beneath the cargo carrying floor of the truck bed portion 12.

Referring again to FIG. 2, the inner bed components can further include a left side member 18, a right side member 19, a headboard member 23, and/or a portion (e.g., 22b) of the tailgate 22. The members 18, 19, 23 and the tailgate portion 22b can assist in restraining cargo within the truck bed portion 12. The inner bed components and the shell can be formed from any number of materials, as for example, metal (e.g., steel or aluminum), plastic, fiberglass, composites, and/or a combination thereof. For example, the inner bed components and/or the shell can be at least partially formed of plastic and/or metal. In one exemplary embodiment, the inner bed components and the shell can be formed from one or more plastic panels. For example, each of the left side member 18, the right side member 19, the headboard member 23, the first closure member 16, the second closure member 64, and the bed floor 14 can comprise a separate SMC (Sheet Molded Compound) plastic panel. One or more of these plastic panels might comprise and/or be associated with integral or non-integral metal reinforcement components. For example, braces 94 and 95 (shown in FIG. 5) can be formed from metal and glued with adhesive to the underside of the second closure member 64.

The inner bed components can be supported by an underlying metal support structure. The metal support structure can be in a fixed position relative to a pickup truck, and in some embodiments can be secured to a pickup truck frame or unibody such as with welds, bolts, or other fastening. In another embodiment, the metal support structure might be integral with the pickup truck's frame or unibody. A metal support structure can comprise steel, aluminum, one or more other metals, and/or a combination thereof.

Figure 3:
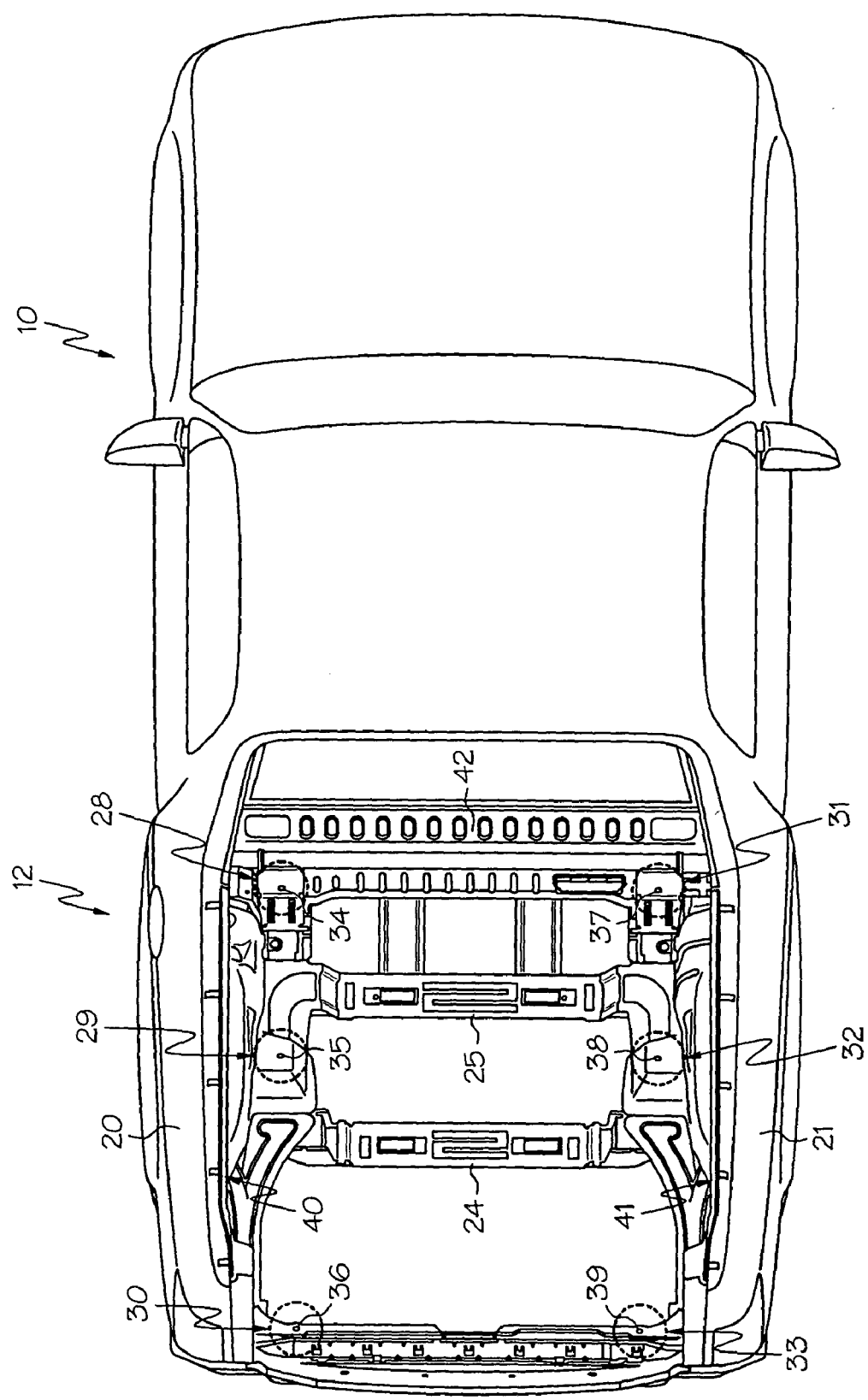
FIG. 3 is a top plan view depicting the pickup truck of FIG. 2 with certain components removed to expose an exemplary underlying metal support structure.

A metal support structure can include one or more support members. A support member provides support and/or a fastening location for at least a portion of one or more of the inner bed components. For example, an exemplary metal support structure is shown in FIG. 3 to integrally comprise a plurality of support members 28, 29, 30, 31, 32 and 33 that are configured to provide subjacent support to the bed floor 14, the first closure member 16, the second closure member 64, and/or the shell 72. Referencing FIGS. 3 and 5, the bed floor 14, the second closure member 64, and the shell 72 can each be fixedly supported by the metal support structure, for example, by aligning apertures 46 and 49 in the bed floor 14 with apertures 36 and 39 in respective support members 30 and 33, and by further aligning apertures 44, 45, 47 and 48 in the second closure member 64 with apertures 67, 69, 71 and 73 in the shell 72 and with apertures 34, 35, 37 and 38 in the respective support members 28, 29, 31 and 32, and then by inserting bolts or other fasteners through these aligned apertures.

The metal support structure of FIG. 3 is also shown to include a left support structure 40 (e.g., for providing support for the left outer body panel 20 and/or the left side member 18), a right support structure 41 (e.g., for providing support for the right outer body panel 21 and/or the right side member 19), and a headboard support structure 42 (e.g., for providing support for the headboard member 23). Of course, it should be understood that the specific configuration of the metal support structure will vary depending upon the specific type and configuration of the inner bed components and/or of the shell (e.g., the shape and configuration of the cargo carrying floor and any underlying chambers).

As illustrated in FIG. 4, the first closure member 16 can be opened to reveal both a first chamber 70 and a second chamber 86 that each can be disposed substantially or entirely beneath the plane (e.g., plane "P"). In the embodiment depicted in FIG. 4, a shell 72 is shown to integrally define a portion of the first chamber 70 and a portion of the second chamber 86. More particularly, the shell 72 can include a first left side surface 74, a first right side surface 75, a first front surface 76, a first back surface 77, and a first bottom surface 78. These first surfaces (74, 75, 76, 77, 78) can be configured to at least partially define the first chamber 70. The shell 72 can further include a first opening 80 to the first chamber 70 that is configured to be selectively covered by a first closure member 16 (e.g., configured as a cargo lid) when the first closure member 16 is closed. In one exemplary embodiment of the present invention, the first opening 80 is of sufficient size and dimension to allow the passage of a spare tire therethrough. One or more drain holes (e.g., 84) can be provided in the shell 72 such as to facilitate the egress of moisture from within the first chamber 70 and/or the second chamber 86 to the outside atmosphere.

As shown most clearly in FIG. 5, the shell 72 can further include a second left side surface 89, a second right side surface 90, a second front surface 91 and a second bottom surface 92. These second surfaces (89, 90, 91 and 92) can be configured to at least partially define the second chamber 86. The second chamber 86 can be further defined by the underside of the second closure member 64, wherein the second closure member 64 can support cargo directly above the second chamber 86. The second chamber 86 can be sized and configured to provide a storage location directly beneath the second closure member 64. This storage location can be sized to provide storage for a spare tire or other items. More particularly, this storage location can be configured to substantially surround an entire spare tire (e.g., for a pickup truck) directly beneath the second closure member 64 (e.g., as shown in FIG. 4). More particularly, the spare tire 66 can be placed directly upon the second bottom surface 92 of the shell 72. Alternatively, as depicted in FIGS. 4–5, an optional spare tire tray 68 can be provided to support the spare tire 66 in sliding engagement with respect to the shell 72 in order to facilitate easier movement of the spare tire through an interface 82 between the first chamber 70 and the second chamber 86. The spare tire tray 68 can be formed from any of a variety of suitable materials such as steel, aluminum, plastic, fiberglass, composites, and/or a combination thereof. In one exemplary embodiment, the spare tire tray 68 is formed from plastic. A spare tire for a pickup truck can include an extra wheel (including an inflated tire mounted upon a rim) that can be used to replace a defective wheel on the pickup truck such as in the event of an unexpected loss of air in the defective wheel. In some circumstances, a spare tire might be equivalent in size to the defective wheel and might accordingly be suitable to permanently replace the defective wheel, but in other circumstances the spare tire might be smaller than the defective wheel and might accordingly only be suitable to temporarily replace the defective wheel.

Figure 6:
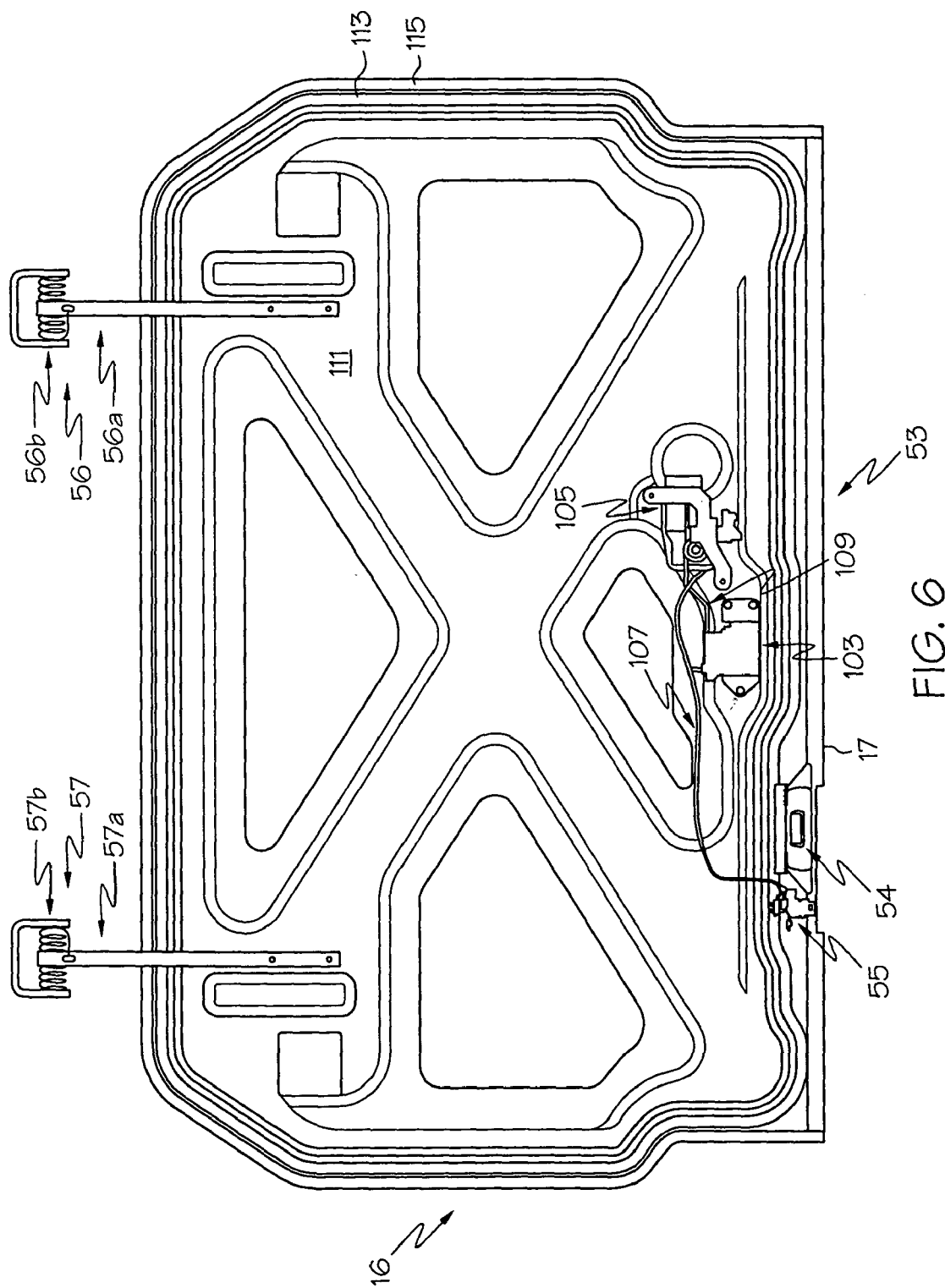
FIG. 6 is a bottom plan view depicting the closure member of FIGS. 2 and 4–5 in conjunction with an exemplary hinge arrangement.

Turning now to FIG. 6, the first closure member 16 can include at least one support panel (e.g., 111) that substantially underlies the first support surface 17 for providing strength and rigidity to the first support surface 17. Although the support panel 111 can be formed from any of a variety of materials, in an exemplary embodiment the support panel 111 comprises metal. The first closure member 16 can be associated with the shell 72 in any of a variety of specific configurations. For example, the first closure member can be hingedly associated with the shell 72. More particularly, hinges 56 and 57 can connect the first closure member 16 directly to the bed floor 14, directly to the shell 72, directly to the second closure member 64, and/or to another portion of the truck bed 12. In the embodiment depicted by FIGS. 4–5, bolts or other fasteners can be used to secure the hinge 56 against the second left side surface 89 of the shell 72 (e.g., at a specific location that is reinforced by a hinge support plate). A similar mounting arrangement might also be provided to secure the hinge 57 to the second right side surface 90 of the shell 72. In such a configuration, the hinges 56 and 57 allow the first closure member 16 to move or swing between a first position and a second position. In the first position, the first support surface 17 of the first closure member 16 is substantially coplanar with the plane and is configured to support cargo directly above the first chamber and to at least partially cover the first opening 80 to the first chamber 70. In the second position, the first closure member 16 is at least partially removed (e.g., from the first opening 80) to provide access to the first chamber 70 from above the plane and through the first opening 80.

Those skilled in the art will appreciate that the hinges (e.g., 56 and 57) can be spring-loaded (e.g., as shown in FIG. 6) in order to selectively support a closure member (e.g., 16) in its opened position until such time as the closure member is pushed downwardly into its closed position (e.g., by an operator). More particularly, the springs can provide a toggle function for maintaining the associated closure member in either an open position or a closed position. The hinge 56 is shown in FIG. 6 to include an arm 56a that connects the support panel 111 to the spring assembly 56b, wherein the spring assembly 56b can be fastened to the second left side surface 89 (shown in FIG. 5, and that can be reinforced by a hinge support plate). Similarly, the hinge 57 is shown in FIG. 6 to include an arm 57a that connects the support panel 111 to the spring assembly 57b, wherein the spring assembly 57b can be fastened to the second right side surface 90 (shown in FIG. 4, and that can be reinforced by a hinge support plate). Of course, it should be understood that other supporting arrangements can additionally or alternatively be provided to selectively maintain the closure member in an opened and/or closed position.

As best shown in FIG. 6, a securement mechanism 53 can be moveable between locked and unlocked positions for selectively locking or retaining the closure member(s) (e.g., the first closure member 16) in the first position (e.g., closed). For example, the securement mechanism 53 can include a lock 103 for selectively engaging an aptly positioned catch (e.g., 63 shown in FIG. 4) to thereby retain the first closure member 16 in its closed position during engagement of the lock and catch. The first closure member 16 can then be opened when the lock 103 disengages the catch 63. Although FIG. 6 depicts the lock 103 as being mounted upon the first closure member 16 and FIG. 4 depicts the catch 63 being supported by the shell 72, it should be understood that a securement mechanism might alternatively include a catch that is mounted upon the first closure member 16 and a lock that is attached to the shell 72. In still further embodiments, multiple lock/catch sets might be provided for a single closure member 16, or one or more other varieties of securement mechanisms might be implemented.

An opening mechanism can be coupled to the securement mechanism (e.g., via a linkage 109), and can be configured to move the securement mechanism between locked and unlocked positions. For example, an opening mechanism can include an electromechanical actuator 105 that is configured to cause the selective engagement/disengagement by the lock 103 of the catch 63 in response to an opening signal, and the resultant locking/unlocking of the first closure member 16. An opening mechanism might also include one or more devices that are configured to receive electrical and/or mechanical opening signals from an operator. Such devices can include a handle 54 and/or a key cylinder 55 (e.g., as might be connected to the actuator 105 via a cable 107), for example. However, the opening mechanism might alternatively receive an opening signal from a remote location or device, such as from an electronic pushbutton or switch and/or from a radio frequency signal or infrared signal generated by a remote control device or key-fob device in the possession of an operator.

In the specific embodiment depicted in FIG. 6, the securement mechanism 53 and the opening mechanism (including the actuator 105, the handle 54, and the key cylinder 55) are attached to the first closure member 16, but are both disposed entirely below the first support surface 17 when the first closure member 16 is in its first position (e.g., closed). Hence, no portion of the securement mechanism 53 or the opening mechanism extends through the first support surface 17 or is accessible from above the first support surface 17. In this manner, the securement mechanism 53 and the opening mechanism can be substantially protected from contact with cargo, rain, dirt, and/or other debris when the first closure member 16 is closed, and their durability and reliability can accordingly be maximized. Of course, it should be understood that a securement mechanism and an opening mechanism arrangement can be associated with any closure member (e.g., the first closure member 16 and/or the second closure member 64) of the truck bed portion 12 in any of the configurations herein described or in any of a variety of alternate configurations.

Sealing elements can be provided to interface one or more closure members to each other and/or to the floor bed 14. For example, as shown most clearly in FIG. 6, the first closure member 16 can include a first sealing element and a second sealing element. The first sealing element can comprise a gasket 113 that attaches to the underside of the first closure member 16 adjacent to the entire outer perimeter of the first closure member 16. The second sealing element might include a gasket 115 that is spaced from the first sealing element and that is attached to the underside of the first closure member 16 adjacent to at least part of the outer perimeter of the first closure member 16. In an exemplary embodiment, each of these gaskets 113, 115 are configured to interface one or more channels (e.g., 85 in FIG. 4) formed in the bed floor 14 and/or in a second closure member 64 of the truck bed portion 12 when the first closure member 16 is closed. Such channel(s) might be provided with one or more drain holes to facilitate the escape of any moisture that might evade one or more of the sealing elements (e.g., gaskets 113, 115). In an alternate embodiment, fewer or additional sealing elements might be provided in similar or alternative configurations to selectively seal a closure member against the bed floor, the shell and/or against other closure members. Although the foregoing examples discuss sealing elements for use with the first closure member, it should be understood that sealing elements might additionally or alternatively be provided for use with other closure members of an exemplary truck bed portion 12 (e.g., the second closure member 64).

FIG. 5 depicts an exploded view of an exemplary truck bed portion 12. The left side member 18, the right side member 19, and the headboard member 23 of the truck bed portion 12 are shown in FIG. 5 as being separate from the bed floor 14, the first closure member 16 and the second closure member 64. As shown, the left side member 18 can be configured to at least partially overlap a tab 50 along the left side of the bed floor 14. Likewise, the right side member 19 can be configured to at least partially overlap a tab 51 along the right side of the bed floor 14. Furthermore, the headboard member 23 can be configured to at least partially overlap a tab 52 along the front of the bed floor 14. Although these overlapping portions might be attached, such portions can alternatively remain unattached but rather spaced with foam or another such material (e.g., to prevent wearing caused by relative sliding therebetween). It is to be understood, however, that in alternate embodiments of the present invention, one or more inner bed components (e.g., the members 18, 19, and 23) can be integral with the bed floor 14 and/or with one or more closure members (e.g., 16 and/or 64).

As shown most clearly in FIG. 5, the first chamber 72 is adjacent to the second chamber 86 at an interface 82. More particularly, the second surfaces (89, 90, 91, and 92) of the shell 72 can meet the first surfaces (74, 75, 76, 77, and 78) of the shell 72 at the interface 82. The interface 82 identifies the portion of the shell 72 that is immediately adjacent to both the first chamber 70 and the second chamber 86. In some embodiments, the interface comprises a wall for separating the first chamber from the second chamber. However, in other embodiments, the interface can be at least partially open to thereby join the first chamber to the second chamber and to resultantly facilitate access therebetween. One type of open interface between the first and second chambers is a constrictive interface, as shown for example in FIGS. 4 and 5 (e.g., 82). A constrictive interface involves an opening between two adjacent chambers that is not large enough to facilitate the passage of certain cargo from one chamber into the other chamber. For example, as shown in FIGS. 4–5, because the interface 82 is dimensionally smaller than the adjacent portion of the first chamber 70, certain (e.g., large) cargo that can be stored within the first chamber 70 cannot pass through the interface 82 for storage in the second chamber 86. Hence, a constrictive interface can comprise a dimensional discontinuity between two adjacent chambers such as when the shell includes a first plurality of surfaces defining the first chamber and a second plurality of surfaces defining the second chamber, and at least one of the first plurality of surfaces is not substantially coplanar with any of the second plurality of surfaces (e.g., as shown in FIGS. 4–5). In yet another exemplary embodiment (not shown), a constrictive interface can comprise a wall between two similarly-dimensioned adjacent chambers, wherein the wall includes an opening that joins the two chambers but that the opening is dimensionally smaller than the adjacent portions of either of the two chambers.

In the embodiment depicted in FIGS. 4–5 having a substantially unitary shell 72, the interface 82 is depicted as being located at the discontinuity in the shell 72 that separates the first chamber 70 from the second chamber 86. However, it should be understood that in alternate embodiments having a multiple-piece shell, the interface may or may not reside at a junction between two respective pieces of the shell. If a shell is formed from multiple pieces, these pieces can be joined with any of a variety of fasteners and/or adhesives, for example.

When the interface 82 comprises an opening dimensioned to permit the passage of a spare tire from the first chamber into the second chamber (as in FIG. 4), the second closure member 64 can be fixedly secured with respect to the shell 72 and a spare tire stored within the second chamber 86 can be accessed (e.g., optionally through use of the tray 68) by an operator through the first chamber 70. More particularly, a spare tire 66 can be inserted into the first chamber 70 through the first opening 80 in the shell 72, and can then be inserted (e.g., by sliding) into the second chamber 86 from the first chamber 70 through the interface 82. Likewise, the spare tire 66 can be removed (e.g., by sliding) from the second chamber 86 into the first chamber 70 through the interface 82, and then removed from the first chamber 70 via the first opening 80 in the shell 72. Tools, batteries, vehicular components, or other cargo can be stored within the first chamber 70. In this embodiment, access to the first chamber 70 can be achieved by an operator of the pickup truck 10 when the first closure member 16 is opened. Access to the second chamber 86 can then be achieved through the first chamber 70. Hence, an exemplary truck bed in accordance with the present invention can facilitate convenient storage of a spare tire and other cargo beneath the floor of a truck bed, all without significantly reducing the truck bed's capacity to haul unprotected cargo (e.g., as compared to a similarly-sized conventional truck bed).

In other embodiments, however, it is contemplated that the interface 82 is not dimensioned to facilitate passage of a spare tire therethrough (e.g., the interface 82 includes no opening or a small opening). In such an embodiment, a spare tire might nevertheless be stored within the second chamber but can be accessed by an operator through a non-fixedly secured but movable (e.g., hinged) second closure member. Hence, a first movable closure member can be provided to facilitate access to the first chamber, and a second movable closure member can be provided to facilitate access to the second chamber.

Again referring to FIGS. 3 and 5, the second bottom surface 92 of the shell 72 can rest upon the lower support members 24 and 25 of the metal support structure. In one exemplary embodiment, the second bottom surface 92 is bolted, adhered or otherwise fastened to one or both of the lower support members 24 and 25. However, in an alternate embodiment, the second bottom surface 92 is not fastened to the lower support members 24 and 25, but merely rests thereon. In either configuration, the weight of a spare tire within the second chamber 86 rests largely upon the lower support members 24 and 25, instead of straining any connection between the shell 72 and the bed floor 14 and/or the closure members 16 and 64.

Support braces 94 and 95 are depicted in FIG. 5 as spanning across at least part of the width of the pickup truck 10, and are shown as being disposed between the shell 72 and the second closure member 64, and more particularly as being located below the second closure member 64 but above the shell 72 such as for providing strength and rigidity to the second support surface 65. In this manner, the second closure member 64 can be subjacently reinforced by at least one support brace (e.g., 94, 95) that is disposed between the shell 72 and the second closure member 64. The support braces 94 and 95 can be formed from any of a variety of materials such as metals, plastics, fiberglass, composites, combinations thereof, or the like. For example, in one exemplary embodiment, the support braces 94 and 95 can be at least partially formed of metal. The support brace 94 is shown to include apertures 97 and 99, and the support brace 95 is shown to include apertures 98 and 100. Referring to FIGS. 3 and 5, a bolt or other fastener inserted through the aperture 44 in the second closure member 64 can extend through the aperture 97 of the support brace 94, through the aperture 67 in the shell 72, and then into the aperture 34 of the bed floor support member 28 of the pickup truck's metal support structure. Likewise, a bolt or other fastener inserted through the aperture 45 in the second closure member 64 can extend through the aperture 98 of the support brace 95, through the aperture 69 of the shell 72, and then into the aperture 35 of the bed floor support member 29. Still further, a bolt or other fastener inserted into the aperture 47 in the second closure member 64 can extend through the aperture 99 of the support brace 94, through the aperture 71 in the shell 72, and into the aperture 37 of the bed floor support member 31. Also, a bolt or other fastener inserted through the aperture 48 of the second closure member 64 can extend through the aperture 100 of the support brace 95, through the aperture 73 of the shell 72, and into the aperture 38 of the bed floor support member 32. Still further, a bolt or other fastener inserted through the aperture 46 of the bed floor 14 can extend into the aperture 36 in the bed floor support member 30, and a bolt or other fastener inserted through the aperture 49 of the bed floor 14 can extend into the aperture 39 in bed floor support member 33. In this manner, the bed floor 14, the shell 72 and the second closure member 64 can be secured to and can be supported by the underlying metal support structure of the truck bed portion 12. It should be understood, however, that a variety of alternative configurations are available for securement of a bed floor, a shell and a closure member to a support structure.

It should also be understood that although the shell 72 is depicted as having substantially solid surfaces (e.g., non-porous and continuous) such as to substantially prevent passage of dirt and moisture into the shell 72, at least a portion of the shell 72 could alternatively be formed as an open-type structure. For example, the second surfaces 89, 90, 91 and 92 of the shell 72 might be formed as an open-type structure (e.g., with porous or otherwise non-continuous surfaces) that might more readily enable dirt and moisture to access the second chamber 86. If such an open-type structure were provided, a swinging door or other selective barrier might be provided at the interface 82 to facilitate selective access to the second chamber 86 from the first chamber 70, such as to exclude passage of dirt and moisture from the second chamber 86 into the first chamber 70.

The foregoing description of exemplary embodiments and examples of the invention has been presented for purposes of illustration and description. It is not intended to be exhaustive or limit the invention to the forms described. Numerous modifications are possible in light of the above teachings. Some of those modifications have been discussed, and others will be understood by those skilled in the art. The embodiments were chosen and described in order to best illustrate the principles of the invention and various embodiments as are suited to the particular use contemplated. It is hereby intended that the scope of the invention be defined by the claims appended hereto.

What is claimed is:

1. A truck bed for a pickup truck comprising:
   a metal support structure, the metal support structure being in a fixed position relative to a pickup truck;
   a shell fixedly supported by the metal support structure and configured to integrally define a portion of a first chamber and a portion of a second chamber, the first chamber being adjacent to the second chamber at an interface, and the first and second chambers being disposed substantially beneath a plane defined by a cargo carrying floor, the cargo carrying floor being integrally provided by the truck bed;
   a first closure member including a first support surface, the first closure member associated with the shell and being moveable between a first position in which the first support surface is substantially coplanar with the plane and is configured to support cargo directly above the first chamber, and a second position in which the first closure member is at least partially removed to provide access to the first chamber from above the plane; and a second closure member associated with the shell and including a second support surface for supporting cargo directly above the second chamber, the second support surface being substantially coplanar with the plane, and the second chamber being configured to provide a storage location, the storage location being configured to substantially surround an entire spare tire for a pickup truck directly beneath the second closure member.

2. The truck bed of claim 1 wherein the metal support structure is integral with a unibody of a pickup truck.

3. The truck bed of claim 1 wherein the first chamber is joined with the second chamber at the interface.

4. The truck bed of claim 3 wherein the interface is constrictive.

5. The truck bed of claim 3 wherein the shell includes a first plurality of surfaces defining the first chamber and a second plurality of surfaces defining the second chamber, and at least one of the first plurality of surfaces is not substantially coplanar with any of the second plurality of surfaces.

6. The truck bed of claim 1 wherein the first closure member is secured with respect to the shell.

7. The truck bed of claim 6 wherein the first closure member and the shell are connected by at least one hinge.

8. The truck bed of claim 6 further comprising a securement mechanism moveable between locked and unlocked positions for selectively locking the first closure member in the first position, and an opening mechanism for moving the securement mechanism between the locked and unlocked positions, the securement mechanism and the opening mechanism both being disposed entirely below the first support surface when the first closure member is in the first position, and the opening mechanism comprising at least one of a handle and a key cylinder.

9. The truck bed of claim 3 wherein the second closure member is fixedly secured with respect to the shell.

10. The truck bed of claim 9 wherein the second closure member is removably fixedly secured with respect to the shell.

11. The truck bed of claim 10 wherein bolts are provided to connect the second closure member with respect to the shell.

12. The truck bed of claim 3 wherein the interface comprises an opening dimensioned to permit the passage of a spare tire from the first chamber into the second chamber.

13. The truck bed of claim 12 further comprising a tray configured to support a spare tire in sliding engagement with respect to the shell in order to facilitate easier movement of a spare tire through the interface between the first chamber and the second chamber.

14. The truck bed of claim 1 wherein the second closure member is subjacently reinforced by at least one support brace disposed between the shell and the second closure member.

15. The truck bed of claim 14 wherein the support brace is at least partially formed of metal.

16. The truck bed of claim 1 wherein the shell is at least partially formed of plastic.

17. The truck bed of claim 1 wherein the shell is at least partially formed of metal.

18. The truck bed of claim 1 wherein the shell is integral with at least a portion of a bed floor.

19. The truck bed of claim 1 further comprising at least one side member.

20. The truck bed of claim 1 further comprising a headboard member.

21. The truck bed of claim 1 wherein the first closure member further comprises at least one support panel.

22. A truck bed for a pickup truck comprising:
a metal support structure, the metal support structure being in a fixed position relative to a pickup truck;
a shell fixedly supported by the metal support structure and configured to integrally define a portion of a first chamber and a portion of a second chamber, the first chamber joined with the second chamber at a constrictive interface, and the first and second chambers being disposed substantially beneath a plane defined by a cargo carrying floor, the cargo carrying floor being integrally provided by the truck bed;
a first closure member including a first support surface, the first closure member associated with the shell and being moveable between a first position in which the first support surface is substantially coplanar with the plane and is configured to support cargo directly above the first chamber, and a second position in which the first closure member is at least partially removed to provide access to the first chamber from above the plane; and
a second closure member associated with the shell and including a second support surface for supporting cargo directly above the second chamber, the second support surface being substantially coplanar with the plane.

23. The truck bed of claim 22 wherein the metal support structure is integral with a unibody of a pickup truck.

24. The truck bed of claim 22 wherein the first closure member is secured with respect to the shell.

25. The truck bed of claim 24 wherein the first closure member and the shell are connected by at least one hinge.

26. The truck bed of claim 24 further comprising a securement mechanism moveable between locked and unlocked positions for selectively locking the first closure member in the first position, and an opening mechanism for moving the securement mechanism between the locked and unlocked positions, the securement mechanism and the opening mechanism both being disposed entirely below the first support surface when the first closure member is in the first position, and the opening mechanism comprises at least one of a handle and a key cylinder.

27. The truck bed of claim 22 wherein the second chamber is configured to provide a storage location, the storage location being configured to substantially surround an entire spare tire for a pickup truck directly beneath the second closure member.

28. The truck bed of claim 27 wherein the interface comprises an opening dimensioned to permit the passage of a spare tire from the first chamber into the second chamber.

29. The truck bed of claim 22 wherein the second closure member is fixedly secured with respect to the shell.

30. The truck bed of claim 29 wherein the second closure member is removably fixedly secured with respect to the shell.

31. The truck bed of claim 30 wherein bolts are provided to connect the second closure member with respect to the shell.

32. A pickup truck having a truck bed, the truck bed comprising:
a metal support structure, the metal support structure being integral with a unibody of a pickup truck;

a shell fixedly supported by the metal support structure and configured to integrally define a portion of a first chamber and a portion of a second chamber, the first chamber joined with the second chamber at a constrictive interface, the interface comprising an opening dimensioned to permit the passage of a spare tire for a pickup truck from the first chamber into the second chamber, and the first and second chambers being disposed substantially beneath a plane defined by a cargo carrying floor, the cargo carrying floor being integrally provided by the truck bed;

a first closure member including a first support surface, the first closure member being secured with respect to the shell by at least one hinge and being moveable between a first position in which the first support surface is substantially coplanar with the plane and is configured to support cargo directly above the first chamber, and a second position in which the first closure member is at least partially removed to provide access to the first chamber from above the plane; and a second closure member being fixedly secured with respect to the shell and including a second support surface for supporting cargo directly above the second chamber, the second support surface being substantially coplanar with the plane, and the second chamber being configured to provide a storage location, the storage location being configured to substantially surround an entire spare tire for a pickup truck directly beneath the second closure member.

33. The truck bed of claim 32 further comprising a securement mechanism moveable between locked and unlocked positions for selectively locking the first closure member in the first position, and an opening mechanism for moving the securement mechanism between the locked and unlocked positions, the securement mechanism and the opening mechanism both being disposed entirely below the first support surface when the first closure member is in the first position, and the opening mechanism comprising at least one of a handle and a key cylinder.

34. The truck bed of claim 32 further comprising a tray configured to support a spare tire in sliding engagement with respect to the shell in order to facilitate easier movement of a spare tire through the interface between the first chamber and the second chamber.

35. The truck bed of claim 32 wherein the first closure member further comprises at least one support panel.

36. The truck bed of claim 32 wherein the second closure member is subjacently reinforced by at least one support brace disposed between the shell and the second closure member.

* * * * *